LIGHT-RESPONSIVE CONTROL SYSTEM

Filed Dec. 21, 1962 2 Sheets-Sheet 1

INVENTOR.
RONALDO M. SANABRIA
BY
Leonard S Kuss
ATTORNEY

April 26, 1966 R. M. SANABRIA 3,248,549

LIGHT-RESPONSIVE CONTROL SYSTEM

Filed Dec. 21, 1962 2 Sheets-Sheet 2

INVENTOR.
RONALDO M. SANABRIA
BY
[signature]
ATTORNEY

United States Patent Office 3,248,549
Patented Apr. 26, 1966

3,248,549
LIGHT-RESPONSIVE CONTROL SYSTEM
Ronaldo M. Sanabria, 3532 N. Ashland Ave., Chicago, Ill.
Filed Dec. 21, 1962, Ser. No. 246,418
18 Claims. (Cl. 250—210)

This invention relates to systems for providing an end function under the control of a directed beam of light. More particularly, it has reference to a system of this general class which is reliable in response to the controlling light, is unambiguous, and is unaffected by ambient or incident illumination having no relation to the directed beam.

Similarly functioning systems heretofore known have employed photoelectric devices actuated by non-polarized light, transmitted radio frequencies or transmitted ultrasonic frequencies. Those with which I am familiar involve complex receivers together with their attendant servicing and maintenance problems, high relative cost and expensive stand-by operation. The radio and ultrasonic frequency methods possess another serious limitation which is inherent and unavoidable, namely spurious response to an interfering signal. For example, it is well-known that remote control of a television receiver by the use of ultra-sonic frequencies will trigger neighboring, similarly equipped receivers because of the non-directional character of the controlling signal. The photoelectric method suffers by responding to sporadic or varying ambient illumination. For example, a television receiver equipped to be controlled by non-polarized light from a flashlight may be triggered into unpredictable response simply by the turning on of a table lamp located nearby.

The present invention has for its principal object the provision of a system for effecting a function remotely in response to a beam of incident light emanating from a suitable source, say a flashlight emitting non-polarized light and equipped with an appropriate polarizing filter or filters, or emitting colored light and utilizing complementary color filters. In another aspect non-polarized light may be used in connection with light-receiving apertures positioned in a predetermined array. In any of these cases an impedance bridge is arranged to be responsive to any of the light signals and the output thereof fed to a circuit of novel form so constructed and arranged as to perform the desired function notwithstanding removal of the triggering pulse.

A system constituted in accordance with the principles of the invention is proof against spurious operation by ordinary ambient illumination. The invention is not be understood as restricted to the use of light as a signal-initiating means per se, but to the use of such source together with apparatus responsive to such illumination which is unambiguous and rapid in response.

Another object is to provide a system as aforesaid capable of operation on alternating current thereby dispensing with the need for a direct current supply or rectified A.C.

A further object is to provide a system as aforesaid which is extremely simple and compact whereby the same may be readily incorporated at the factory in equipment now available without undue expense, and which may be marketed as a kit for installation on the site. Moreover the source of illumination may be of suitable, easily available type, e.g. a common flashlight, over the end of which the required filter or filters may be received by means of a simple, snap-on, mounting bezel.

Other objects and advantages of the invention will become evident from the ensuing description which, taken with the accompanying drawings, discloses certain preferred modes in which the principles of the invention may be carried into practice.

Broadly regarded, the invention comprehends a controlling source, i.e., a beam of polarized light which is caused to impinge upon a normally balanced impedance bridge of the Wheatstone-derived type which contains, in each arm thereof, a photosensitive element which is rendered insensitive to other than suitably polarized light by means of a filter. Alternatively, it is within contemplation to utilize a beam of light of some selected color, in which event the filter associated with each photosensitive element will be of complementary color. In referring to filters of complementary colors, I intend to refer to those which will transmit the light frequencies not transmitted by the aforesaid primary color filters, and which will not transmit the light frequencies transmitted by the primary color filters. A pair of filters thus constituted, each one passing light frequencies rejected by the other, is referred to in the art of optics as a pair of complementary filters. The photosensitive elements are so disposed and the beam is of such transverse or intercepted area at the plane of the photosensitive elements, as to result in unbalance of the bridge when the beam is caused to impinge upon appropriate ones of the elements. The resulting output of the bridge may then be utilized for a control function in connection with other components to be described.

Although, for conciseness of exposition, the bridge is referred to as an "impedance" bridge, it will become apparent from what follows that the same may be a pure "resistance" bridge.

Where, in this specification, I employ the words "Wheatstone-derived bridge" I intend to refer to an electrical bridge based on the classical Wheatstone bridge which, as may be demonstrated by mathematical analysis, may have its input and output terminals interchanged without alteration in its net behaviour in the circuit of which it forms a part.

If a capacitative bridge is selected then the conjugate impedance constituting the output may be the primary of a step-up transformer thereby to augment the relatively low net voltage output of the bridge resulting from the unbalance of the photosensitive elements alone. In this case the total inductance represented by the transformer is so chosen in relation to the capacitors as to result in maximum current output from the bridge.

In one aspect the invention contemplates a controlled circuit including the bridge which is self-sustaining, viz. a momentary initiating pulse generated by the impinging illumination will suffice to trigger another portion of the circuitry having inherent lock-in to perform the desired end function notwithstanding removal of the initiating pulse.

Figures 1, 2, 3, 4:
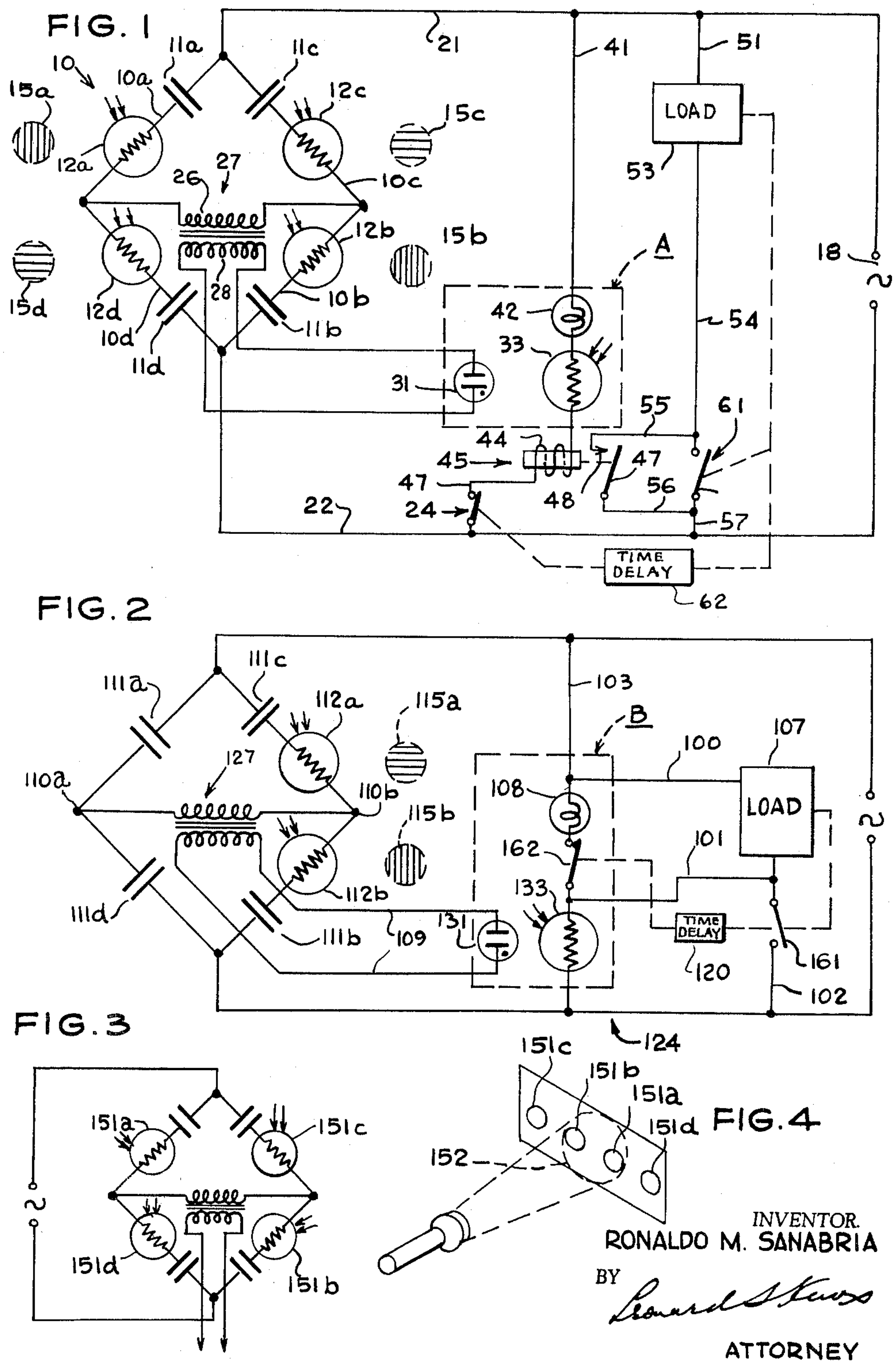
FIG. 1 is a circuit diagram of one form of circuit actuatable by polarized light from a convenient source.
FIG. 2 is an alternative form of the circuit of FIG. 1.
FIG. 3 shows another alternative form of the circuit of FIG. 1 with certain repeated components omitted.
FIG. 4 illustrates one mode of controlling the circuit of FIG. 3.

Thus, referring first to FIG. 1 of the drawings there is shown, by way of example, an impedance bridge represented generally at 10 comprising four arms arranged as opposite, jointly-functioning pairs 10*a*–10*b* and 10*c*–10*d*, each including an impedance element 11*a*, 11*b*, 11*c* and 11*d*, in this case simply a capacitor, in series connection with associated photoconductors 12*a*, 12*b*, 12*c* and 12*d*, e.g. a cadmium-sulphide photoconductive cell, sometimes termed a light dependent resistor. This is a device whose electrical conductivity varies with the intensity of the light incident thereupon, and is preferred for the reason that the same is characterized by far higher lumen sensitivity than, say, selenium photocells, i.e. sensitivity measured in amperes per lumen. For example, one commercial form of cadmium sulphide photoconductor, when exposed to an intensity of illumination of 1,000 to 10,000 lux has a resistance on the order of only 100 ohms, as compared to a dark resistance of 100 megohms. In order to avoid any misunderstanding it is to be noted that the lux sensitivity (in amperes/lux) may be derived from the lumen sensitivity (in amperes/lumen) by multiplying the latter by the area (in $mm.^2$) of the sensitive surface of the photoconductor. In comparing CdS photoconductors with, say, selenium photocells in the two standards of measurement it is necessary also to specify the applied voltage to which the sensitivity applies.

The legs of the bridge may comprise other arrangements including the photoconductor, such as inductors, other resistors, and combinations thereof with capacitors.

The photoconductors 12*a* and 12*b* are equipped with polarized filters 15*a* and 15*b* to pass, say vertically polarized light from some suitable source, e.g. a handheld flashlight also equipped with a filter to emit vertically-polarized light. Such filter may be mounted in a bezel adapted for snap-type engagement over the end of any commercial type of flashlight. The photoconductors 12*c* and 12*d* are provided with horizontally-polarized filters subject to the control of the same source which is rotated between positions 90° apart to activate one or the other pair of photoconductors 12*a* and 12*b* or 12*c* and 12*d*.

When unpolarized light illuminates all four photoconductors the bridge remains in balance and the output is zero. However when the incident illumination is of one or the other of the two planes of polarization which are 90° apart only the matching plane of polarization is effective. Assuming vertically polarized light, then photoconductors 12*a* and 12*b* are affected and the bridge becomes unbalanced; or, assuming horizontally polarized light, then photoconductors 12*c* and 12*d* are activated with like effect. It will be understood that unbalance of the bridge is coincident in time with the duration of the incident illumination.

It is possible to eliminate either photoconductors 12*a* and 12*d*, or 12*c* and 12*b*, but in this case the bridge will respond with only half the sensitivity of the bridge described in the foregoing paragraph.

Energizing voltage 18 for the bridge is fed through buses 21 and 22, the latter of which is desirable interruptible by means of a switch 24 actuatable in a manner to be described.

Output from the bridge is impressed across the primary 26 of a step-up transformer 27, the secondary 28 of which is connected across a neon bulb 31. This latter is in such physical relation to another photoconductor 33 as to actuate the same into increased current-carrying condition. That is to say, its resistance at some specified illumination and applied voltage becomes sufficiently low as to permit some predetermined current to flow.

The transformer 27 is so designed in relation to the impedance which is "seen" by the output of the bridge, e.g. the capacitor-photoconductor combination, and the frequency of the power input to insure maximum flow of current in the output, i.e. resonant condition in the output. Thus, low level excitation of the bridge photoconductors will result in high level illumination of the bulb 31.

Assuming the use of vertically polarized light, the photoconductors 12*a* and 12*b* will be activated, with the result that current flow in legs 10*a* and 10*b* will increase and an output current which is the vector difference of the current in legs 10*a* and 10*d* on the one hand and that in legs 10*b* and 10*c* on the other, will flow in the primary 26. Assuming some acceptable step-up ratio an increased voltage will be applied across the neon lamp 31.

Inasmuch as the lamp 31 is so positioned with respect to the photoconductor 33 as to activate the same, its resistance will drop and cause increased flow of current from A.C. source 18, through bus 21, and thence through the branch 41, an ordinary incandescent lamp 42, photoconductor 33, winding 44 of a relay 45, branch 47, closed switch 24 to bus 22. The lamp 42 is in light-transmitting relation with the photoconductor 33 so that the lamp will, upon increased flow of current therethrough, assume the function of the neon bulb 31 to maintain the photoconductor 33 in its low resistance condition, notwithstanding removal of the illumination originally availed of to activate the bridge. Such mode of operation may be conviently described as "regenerative" or as similar in function to that of a wound relay having a pair of holding contacts.

The winding 44 of the relay 45 is so designed that upon flow of current in the amount permitted by the lamp 42 and photoconductor 33, when in the previously described regenerative lock-in the armature will pull in to complete a circuit through the back contact 48 whereby to complete a circuit from bus 21 through conductor 51, a load 53, conductors 54 and 55, back contact 48, armature 47, conductors 56 and 57 to bus 22. Thus the load is energized and will remain so energized by virtue of the regenerative action of the lamp 42 and the photoconductor 33, notwithstanding interruption of the energizing signal theretofore applied to the neon bulb 31.

The load 53 may consist of any suitable device to be actuated, e.g. an electric motor driving the station selector shaft of a television receiver, a motor-equipped garage door and the like. When such travel has been initiated, some suitable means provided as part of the load device will operate a switch 61 to closed position to connect line voltage 18 to the load, whereby the load continues in its energized state to perform some useful function. Suitable association of the switch 61 with the load 53 is indicated in broken lines. Such association may, in the case of a rotatable load, for example, comprise a cam with the switch 61 actuated thereby. The switch 24 is arranged to be opened immediately following actuation of the switch 61 by a direct mechanical linkage or through any equivalent electrical linkage depending on the physical orientation of the load device 53 to such switch. If desired, any suitable time delay means and/or programmer either mechanical or electrical, may be interposed at 62 to ensure that switch 61 is closed before switch 24 is opened. By sequencing means which may be included in the time delay 62 it is assured that the switch 61 is re-opened before the switch 24 re-closes. Thus current through the bus 22 is interrupted to deactivate the relay 45 and the lamp 42 to condition the circuitry for a subsequent cycle of operation.

The invention also contemplates a bridge similar to that just described except that the photoconductors are equipped with color filters rather than polarized filters. Accordingly, by utilizing illumination of the appropriate complementary colors the bridge and its associated components may be activated by utilizing a pair of distinct complementary colors as contrasted with filters which are polarized in planes 90° apart, and which depend upon polarized light. Thus, referring to FIG. 1, the pair of filters 15*a* and 15*b* may be of any selected color and the pair 15*c* and 15*d* of the complementary color. Similarly with the filters 115*a* and 115*b* of FIG. 2, one being of any selected color and the other of the complementary color.

One form of the invention, as shown in FIG. 1, employed components as follows:

| | |
|---|---|
| Lamp 30 | 3 watts, 120 v., incandescent lamp. |
| Photoconductors 12a to 12d | Cadmium sulphide photoconductor rated at 200 milliwatts (Ferroxcube Corp. of America). |
| Transformer 27 | 1:2 ratio with a 14 henry primary inductance. |
| Relay 45 | A.C. relay rated at 25 ma., 30 v. |
| Capacitors 11a to 11d | .5 mf., 200 v. |
| Neon bulb 31, Type NE–2 | 55 v. |

A neon lamp is preferred for exciting the photoconductor 33 controlling the relay 45 since it draws far less current, and is more sensitive than an incandescent lamp at the same voltage. When a suitable igniting voltage is applied to the neon lamp it will provide full light output at once as compared to an incandescent lamp. Thus, the light amplifier is triggered into action with virtually no time delay. Moreover, an incandescent bulb requires more energy for an equivalent light output. However, under some circumstances an incandescent lamp operating at a lower voltage than a neon lamp might be employed, in which case the transformer 27 might be eliminated.

In the interest of further economy the bridge of FIG. 1 may be modified by eliminating the photoconductors in either two of the adjacent arms as shown in FIG. 2. Unbalancing of the bridge is effected by the impingement of light of one polarity or the 90°-displaced polarity, these latter being indicated by the broken-line circles 115a and 115b, which represent the corresponding filters as explained in connection with FIG. 1. The capacitors 111a to 111d, or equivalent impedances, function as the fixed values of the arms of the bridge as will be apparent from the previous portion of the description. The corresponding photoconductor, either 112a or 112b, thus has its resistance lowered to unbalance the bridge to provide output at the conjugate terminals 110a and 110b. A step-up transformer 127, or equivalent means of providing amplification of the output, feeds a neon bulb 131 through the conductors 109 and the illumination provided thereby triggers the circuit comprising the photoconductor 133 and an incandescent bulb 108 into increased current flow. The lamp 108 is positioned to maintain the photoconductor in its low resistance condition in a form of regenerative action as described in respect of FIG. 1. The voltage appearing across the bulb 108 is applied to a suitable load 107, e.g. a bi-stable relay via leads 100, 101 for operation of the controlled circuit and device from which ultimate useful work may be derived.

Actuation of the load 107 from its quiescent or standby condition to "on" causes a switch 161 to be closed to apply line voltage across the load through leads 103, 100 and 102. Following some predetermined time delay, another switch 162 inserted between photoconductor 133 and lamp 108 is opened. Such delay need only be sufficient to insure that switch 161 has been positively closed. Switch 162 must be re-closed through the load at the end of the cycle of operation thereof, and switch 161 must be re-closed. It will be noted that switch 161 is then re-opened before switch 162 re-closes on the succeeding cycle. Any suitable means may be utilized to introduce suitable delay and the sequence of opening and closing, such means being either electrical or mechanical, generally indicated at 120. Thus, bulb 108 is extinguished and the photoconductor 133 restored to its quiescent state in readiness for subsequent activation.

In the embodiment of both FIGS. 1 and 2 the light amplifier unit designated for convenience as A and B respectively has, by virtue of the switches 24 or 162, a wattless stand-by condition thereby increasing the life of the lamp bulbs and photoconductor comprising the same. It will be understood that, by reason of the mechanical or electrical linkage between the load 107 and the switch 161 the load is de-energized when such switch is opened following performance of the task which the load represents. Reliability is also greatly enhanced because of the absence of vacuum tubes, transistors or sensitive relays.

By utilizing an impedance bridge there may be presented, in series with the photoconductors forming part of the bridge, a sufficiently high impedance so that, on the basis that the photoconductors pass some quiescent current due to ordinary ambient light, such current will be a practical minimum. Thus the useful life thereof is substantially increased. However, it will also be clear that, upon unbalancing of the bridge, the series impedance in each arm, including the photoconductor resistance, will be reduced to the extent required to provide the desired current at the output of the bridge.

The embodiment of FIGS. 3 and 4 is intended for use with non-polarized light. The bridge circuit of FIG. 3 is similar to that of FIG. 1 but no polarizing or color filters are employed. For clarity, only the input and output of the bridge are shown but it will be understood that the same may take the form of FIG. 1 or any equivalent form, the desideratum being the use of photoconductors in an impedance bridge to utilize light input as the controlling element.

In this embodiment the photoconductors 151a to 151d are equidistantly positioned in an array such that the spot of incident light 152 having some suitable area measured at the common plane of the photoconductors is capable of encompassing any two photoconductors. Such spot will have an intensity substantially greater than that of the ambient light normally present in the area. Thus, when the spot covers photoconductors 151a and 151b the bridge is unbalanced for operation of the controlled device. On the other hand ordinary ambient light will activate all four photoconductors equally and will be without effect in unbalancing the bridge.

Figure 5:
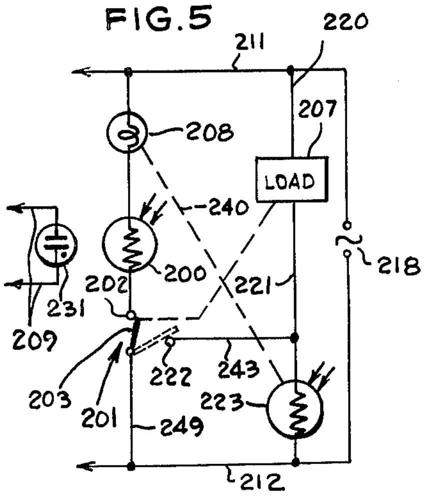
FIG. 5 shows a modified form of the controlled circuit of FIG. 2.

In FIG. 5 I have shown still another embodiment of the controlled circuit, viz. that which receives the output of the bridge and translates the same into a useful function. The output of the bridge is applied to leads 209 feeding a neon lamp 231 which, upon being turned on, affects a photoconductor 200 connected in series with an incandescent lamp 208 and one arm of a single pole-double throw switch 201, the pertinent pole being indicated at 202 and the arm at 203 and, as shown by the broken line, is arranged to be operated by the load. This series circuit is connected across the supply leads 211 and 212 fed from an A.C. source 218. The load 207 is of the same character as referred to previously and has one lead 220 connected to power lead 211, and the other lead 221 connected to the other pole 222 of the switch 201 and to one side of a second photoconductor 223. This latter is in such adjacency to the lamp 208 as to be activated thereby when the lamp is turned on. The other side of the latter is connected to power lead 212.

From the foregoing it will be seen that, with the arm 203 in the position shown in full lines, the signal impressed on the lamp 231 will turn on the photoconductor 200 (in the manner previously described) to initiate current flow through lamp 208 which is in adjacent optical relation with the photoconductor 223 (as indicated by the broken line 240). Since turning on of the photoconductor 200 turns on the lamp 208, and the latter is in such adjacency to the former as to maintain the same turned on, interruption of the signal at lamp 231 is without effect on such maintained relation, i.e., photoconductor 200 and lamp 208 are "latched in." With the activation of the photoconductor 223 current will flow into the load 207 via leads 220 and 221. As soon as the load is initiated into its cycle the arm 203 is moved to contact 222 whereupon current to the load through the photoconductor 223 is shunted through leads 243 and 249. Movement of arm 203 away from contact 202 extinguishes the lamp 208. The switch arm 203 is arranged to close on contact 222 before the photoconductor 223 has recovered its "dark" or high resistance, condition. Energization of the load continues until the load, at some predetermined point in its cycle, reverses the arm 203 to re-establish the series circuit including the arm and its contact 202 in preparation for a subsequent cycle.

The primary advantage of the arrangement just described is the attainment of greater sensitivity of the controlled circuit since the lamp 208 is not shunted by the load during regenerative excitation of the photoconductor 200.

The bridge heretofore described as an "impedance" bridge may be purely resistive, or a combination in each arm of any one or more of resistors, capacitors and inductors, which will be understood to be known variations of the well-known Wheatstone bridge.

The output of the bridge constituted in any of the several ways just outlined may be utilized via a step-up transformer or by means of a capacitative coupling provided that the output is not purely resistive, in which case capacitative coupling is contraindicated.

The resulting multiplied output may be fed to the "photoconductive amplifier," e.g. A or B (FIGS. 1 or 2) by direct coupling, an electronic amplifier, or an electroluminescent light.

In turn, the voltage developed across or as a result of the photoconductive amplifier may be fed to a relay controlling an ultimate device providing a useful output; may be directly impressed on such output, or may in turn activate still another photoconductor of higher rating by means of another lamp.

While I have shown particular embodiments of my invention, it will be understood of course that I do not wish to be limited thereto since many modifications may be made and I therefore contemplate by the appended claims to cover any such modifications as fall within the true spirit and scope of my invention.

I claim:

1. A control system responsive to a beam of incident light polarized in a predetermined plane comprising means providing a beam of light polarized in said plane, a Wheatstone-derived bridge having four arms, each arm of which includes a photoconductor characterized by increase of conductivity in proportion to light in the corresponding plane incident thereupon, the photoconductors in one pair of diagonally opposite arms being provided with light filters polarized in said plane and the photoconductors in the other pair of arms being provided with light filters polarized in a plane displaced 90° from said other plane, an impedance in series with each photoconductor, a source of input voltage connected to the bridge, a load to be activated by the output of the bridge, and means to connect said load to the source of voltage, said means comprising a lamp connected to the output terminals of the bridge, photoconductive means positioned in such adjacency to said lamp to be activated into its conducting state when the lamp is turned on by an output signal from the bridge, switching means in circuit with the photoconductive means, load and voltage source to connect the load to the source when the photoconductive means is rendered conductive, and latching means in circuit with the switching means to maintain the load connected to the voltage source notwithstanding extinguishment of the lamp upon interruption in the bridge output signal.

2. The combination in accordance with claim 1 further characterized in that the input voltage to the bridge is alternating and there is a transformer connecting the lamp to the bridge output terminals.

3. The combination in accordance with claim 1 in which said load-connecting means comprises a second lamp and a normally-closed switch, said switching means is a relay having its winding connected in series with the photoconductive means across the source of voltage, said first and second lamps being disposed in such adjacency to said additional photoconductive means as to activate the same, said first lamp initiating conductivity of said photoconductive means in response to a transient output signal from the bridge, and said second lamp, upon increase of current flow therethrough by virtue of conduction by the photoconductive means, maintaining said photoconductor conductive, said relay having a first, normally open set of contacts, said load having one side permanently connected to one side of the voltage source and the other side connected to the other side of the voltage source through said first set of contacts upon closing thereof, whereby activation of said photoconductive means energizes said relay to connect said load to the voltage source, means connecting said normally-closed switch to the load for actuation thereby, a second, normally-open switch inserted in one of the leads connecting the load to the voltage source and in parallel connection with said first set of contacts; time sequence means under the control of the load to operate said switches from normal position to opposite position whereby initial activation of the load through closing of the relay contacts will close said second switch and open said first switch and, following a predetermined interval, re-close said first switch and re-open said second switch, in that order.

4. The combination in accordance with claim 1 further characterized in that the members of one pair of said bridge photoconductors which are provided with filters of the same polarization are physically disposed in adjacent relation and the members of the other pair are each positioned at respective sides of said first pair, the distance between the centers of the several members being substantially equal and all thereof being in the same physical plane, the beam of light at the said physical plane subtending a distance at least equal to the said center distance.

5. A control system responsive to a beam of incident light polarized in a predetermined plane comprising means providing a beam of light polarized in said plane, a Wheatstone-derived bridge having four arms, two of the arms between the input terminals and one output terminal having an impedance element, the other two of the arms each having an impedance element and a photoconductor connected in series, the photoconductors being characterized by increase of conductivity in proportion to the intensity of the light incident thereupon, the photoconductor in one arm being provided with a light filter polarized in the plane of the incident light and the photoconductor in the other arm being provided with a light filter polarized in a plane displaced 90° from said other plane, a source of input voltage connected to the bridge, a load to be activated by the output of the bridge, and means to connect said load to the source of voltage, said means comprising a lamp connected to the output terminals of the bridge, photoconductive means positioned in such adjacency to said lamp to be activated into its conducting state when the lamp is turned on by an output signal from the bridge, relay means in circuit with the photoconductive means, load and voltage source to connect the load to the source when the photoconductive means is rendered conductive, and latching means in circuit with the relay means to maintain the load connected to the voltage source notwithstanding extinguishment of the lamp upon interruption in the bridge output signal.

6. A control system responsive to a beam of incident light polarized in a predetermined plane comprising means providing a beam of light polarized in said plane, a Wheatstone-derived bridge having four arms, each arm of which includes a photoconductor characterized by increase of conductivity in proportion to the intensity of the light in the corresponding plane incident thereupon, the photoconductors in one pair of diagonally opposite arms being provided with light filters polarized in said plane and the photoconductors in the other pair of arms being provided with light filters polarized in a plane displaced 90° from said other plane, an impedance in series with each photoconductor, means supplying input voltage to the bridge, a first lamp connected across the output of the bridge, another photoconductor of some predetermined rating positioned in adjacency to said first lamp to be activated thereby, a second lamp and a single-pole, double throw switch connected in series circuit across a source of voltage, one contact and the blade of said switch normally closing said series circuit, said one contact being connected to one side of the voltage source, said first lamp when turned on by the output of the bridge initiating conduction through said other photoconductor to turn on said second lamp, a load having one side connected to one side of the voltage source and the other side connected through an additional photoconductor to the other side of the voltage source, the other contact of said switch being connected to a point intermediate the load and additional photoconductor, said additional photoconductor being of higher rating than said other photoconductor sufficient to carry the maximum load current, said additional photoconductor being in such adjacency to said second lamp to be activated thereby to pass said load current, and time sequence means under the control of the load connected to said switch to shift the blade thereof from said one contact thereof to the other contact to transfer said other side of the load to said other side of the voltage source, to shunt out said additional photoconductor and to turn off said second lamp, said time-sequence means being effective to restore the switch blade to said one contact following a predetermined period of operation of the load.

7. A control system responsive to a beam of light of a selected color comprising means providing a beam of light of said selected color, a Wheatstone-derived bridge having four arms, each arm of which includes a photoconductor characterized by increase of conductivity in proportion to light incident thereupon, the photoconductors in one pair of diagonally opposite arms being provided with light filters of said selected color for activation thereby and the photoconductors in the other pair of arms being provided with light filters of complementary color for activation thereby, an impedance in series with each photoconductor, means supplying input voltage to the bridge, a load to be activated by the output of the bridge, and means connecting said load to the output terminals of the bridge.

8. The combination in accordance with claim 7 further characterized in that the input voltage is alternating and there is a transformer fed by the output voltage of the bridge forming part of said load-connecting means.

9. The combination in accordance with claim 7 in which said load-connecting means comprises a first lamp connected across the output terminals of the bridge, photoconductor means, a second lamp, a normally-closed switch and a relay winding connected in series with the photoconductor means across the source of voltage, said first and second lamps being disposed in such adjacency to said photoconductor means as to activate the same, said first lamp initiating conductivity of said photoconductor means in response to a transient output signal from the bridge, and said second lamp, upon increase of current flow therethrough by virtue of conduction by the photoconductor means, maintaining said photoconductor means conductive, said relay having a first, normally-open set of contacts, said load having one side permanently connected to one side of the voltage source and the other side connected to the other side of the voltage source through said first set of contacts upon closing thereof, whereby activation of said photoconductor means energizes said relay to connect said load to the voltage source, means connecting said normally-closed switch to the load for actuation thereby, a second, normally-open switch inserted in one of the leads connecting the load to the voltage source and in parallel connection with said first set of contacts, time sequence means under the control of the load to operate said switches from normal position to opposite position whereby initial activation of the load through closing of the relay contacts will close said second switch and open said first switch and, following a predetermined interval, re-close said first switch and re-open said second switch, in that order.

10. The combination in accordance with claim 7 further characterized in that the members of one pair of said bridge photoconductors which are provided with filters of the same selected color are physically disposed in adjacent relation and the members of the other pair which are provided with filters of the same complementary color are each positioned at respective sides of said first pair, the distance between the centers of the several members thereof being substantially equal and all thereof being in the same physical plane, the beam of light at the said physical plane subtending a distance at least equal to the said center distance.

11. A control system responsive to a beam of light of a selected color comprising means for providing a beam of light of said selected color a Wheatstone-derived bridge having four arms, two of the arms between the input terminals and one output terminal having an impedance element, the other two of the arms each having an impedance element and a photoconductor connected in series, the photoconductors being characterized by increase of conductivity in direct proportion to light incident thereupon, the photoconductor in one arm being provided with a light filter of said selected color and the photoconductor in the other arm being provided with a light filter of the complementary color, a source of input voltage connected to the bridge, a load to be activated by the output of the bridge, and means to connect said load to the source of voltage, said means comprising a lamp connected to the output terminals of the bridge, photoconductive means positioned in such adjacency to said lamp to be activated into its conducting state when the lamp is turned on by an output signal from the bridge, relay means in circuit with the photoconductive means, load and voltage source to connect the load to the source when the photo-conductive means is rendered conductive, and latching means in circuit with the relay means to maintain the load connected to the voltage source notwithstanding extinguishment of the lamp upon interruption in the bridge output signal.

12. A control system responsive to a beam of light of a selected color comprising means to provide a beam of light of said selected color, a Wheatstone-derived bridge having four arms, each arm of which includes a photoconductor characterized by increase of conductivity in proportion to the intensity of the light incident thereupon, the photoconductors in one pair of diagonally opposite arms being provided with light filters of said selected color and the photoconductors in the other pair of arms being provided with light filters of complementary color, an impedance in series with each photoconductor, means supplying input voltage to the bridge, a first lamp connected across the output of the bridge; another photoconductor of some predetermined rating positioned in adjacency to said first lamp to be activated thereby, a second lamp and a single-pole, double throw switch all connected in series circuit across a source of voltage, one contact and the blade of said switch normally closing said series circuit, said one contact being connected to one side of the input voltage, said first lamp when turned on by the output of the bridge initiating conduction through said other photoconductor to turn on said second lamp, a load having one side connected to one side of the voltage source and the other side being connected through an additional photoconductor to the other side of the voltage source, the other contact of said switch being connected intermediate the load and additional photoconductor, said additional photoconductor being of higher rating than said other photoconductor sufficient to carry the maximum load current, said additional photoconductor being in such adjacency to said second lamp to be activated thereby to pass said load current, and time sequence means under the control of the load connected to said switch to shift the blade thereof from said one contact thereof to the other contact to transfer said other side of the load to said other side of the voltage source, to shunt out said additional photoconductor and to turn off said second lamp, said time-sequence means being effective to restore the switch blade to said one contact following a predetermined period of operation of the load.

13. The combination in accordance with claim 1 wherein said latching means comprises a second lamp connected in series with said photoconductive means, second photoconductive means, said second lamp being disposed in adjacent relation to said second photoconductive means to activate the same, said second photoconductive means being arranged to connect the load to the voltage source, said first lamp initiating conduction through the photoconductive means to raise the light output of said second lamp whereby conduction through the second photoconductive means is maintained to continue the load in an energized state.

14. The combination in accordance with claim 13 further characterized by a switch under the control of the load to shunt said photoconductive means and to connect the load directly to the voltage source.

15. The combination in accordance with claim 14 further characterized by a single pole, double-throw switch under the control of the load at some predetermined point in the cycle thereof having the blade and one contact adapted to open and close the circuit through the photoconductive means and second lamp and the blade and other contact adapted to shunt the second photoconductive means and connect the load directly across the voltage source, said blade adapted to be normally closed on its said one contact prior to activation of the photoconductive means and, at said predetermined point in the cycle, to be moved to its other said contact, the blade being restored to its said one contact at the end of the load cycle.

16. The combination in accordance with claim 1 wherein said latching means comprises a second lamp connected in series with said photoconductive, second photoconductive means, said second lamp being disposed in adjacent relation to said second photoconductive means to activate the same, said second photoconductive means being arranged to connect the load to the voltage source, said first lamp initiating conduction through the photoconductive means to raise the light output of said second lamp whereby conduction through the second photoconductive means is maintained to continue the load in an energized state.

17. The combination in accordance with claim 16 further characterized by a switch under the control of the load to shunt said second photoconductive means and to connect the load directly to the voltage source.

18. The combination in accordance with claim 16 further characterized by a single pole, double-throw switch under the control of the load at some predetermined point in the cycle thereof having the blade and one contact adapted to open and close the circuit through the photoconductive means and second lamp and the blade and other contact adapted to shunt the second photoconductive means, and connect the load directly across the voltage source, said blade adapted to be normally closed on its said one contact prior to activation of the photoconductive means and, at said predetermined point in the cycle, to be moved to its other said contact, the blade being restored to its said one contact at the end of the load cycle.

References Cited by the Examiner

UNITED STATES PATENTS

| | | | |
|---|---|---|---|
| 1,963,185 | 6/1934 | Wilson | 250—226 |
| 2,041,079 | 5/1936 | Lyle | 250—225 |
| 2,237,713 | 4/1941 | Russell | 250—226 X |
| 2,278,920 | 4/1942 | Evans | 250—210 X |
| 2,628,316 | 2/1953 | Demuth | 250—210 X |
| 2,656,845 | 10/1953 | Lindsay | 250—226 X |
| 2,777,069 | 1/1957 | Saeman | 250—225 X |
| 2,891,197 | 6/1959 | Guyton | 317—130 X |
| 3,035,176 | 5/1962 | Kis et al. | 250—210 |

RALPH G. NILSON, *Primary Examiner.*

WALTER STOLWEIN, *Examiner.*